Oct. 15, 1957 G. ELLIOTT 2,810,081
ELECTRONIC SWITCH FOR SELECTIVELY BLOCKING OR PERMITTING THE SIMULTANEOUS TRANSMISSION OF SIGNALS IN TWO CHANNELS
Filed Sept. 27, 1955
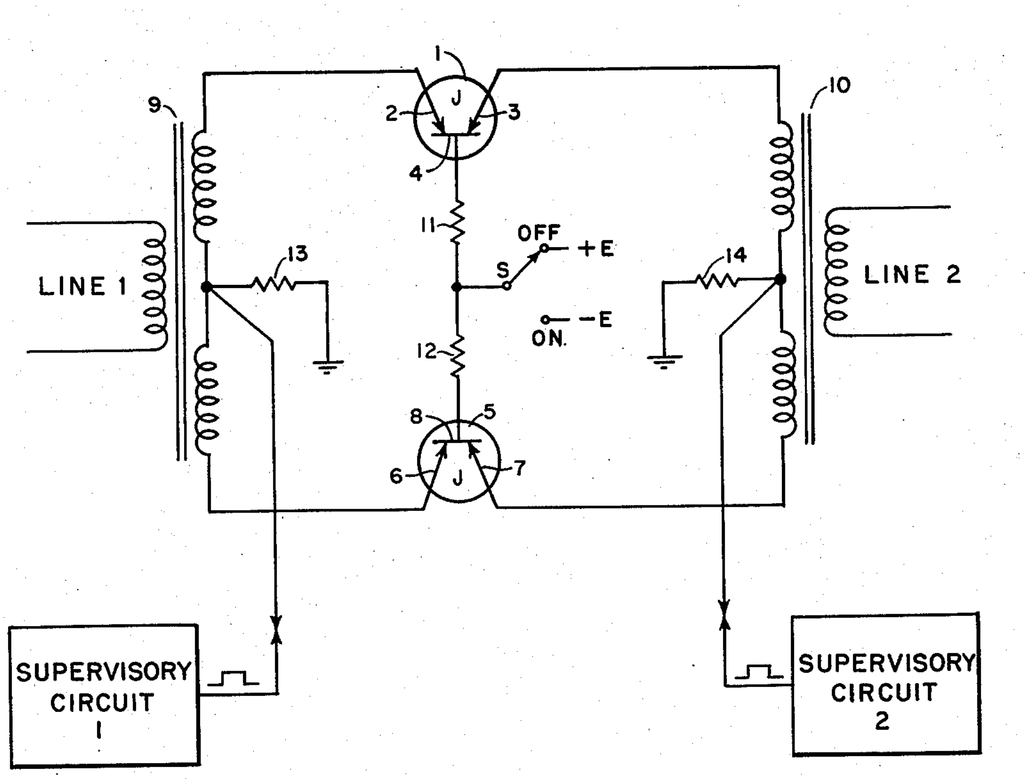
INVENTOR.
GEORGE ELLIOTT
BY F. H. Henson
AGENT United States Patent Office 2,810,081

Patented Oct. 15, 1957

2,810,081

ELECTRONIC SWITCH FOR SELECTIVELY BLOCKING OR PERMITTING THE SIMULTANEOUS TRANSMISSION OF SIGNALS IN TWO CHANNELS

George Elliott, Rochester, N. Y., assignor to General Dynamics Corporation, a corporation of Delaware Application September 27, 1955, Serial No. 536,832

6 Claims. (Cl. 307—88.5)

This invention relates in general to electronic switches, and more particularly to electronic switches for selectively blocking or permitting the simultaneous transmission of signals in two channels.

Although the present invention has general application, it is particularly adapted for use in an electronic telephone system. To establish a telephone call it is necessary to switch both a voice channel and a supervisory channel through the various stages utilized in establishing the call. For example, in the electromechanical step-by-step art, the line finder, selector, and connector switches have at least three brushes. The tip and ring brushes are utilized to switch the voice channel and usually the dial impulsing path from stage to stage while the sleeve brush is used to hold the established connection until the calling party restores his handset. Also, as is well known in the art, trunk lines having a voice channel and a derived signal path are often used to interconnect the offices of a telephone system. In trunk lines of this type, the voice channel is carried on two wires while the supervisory channel is superimposed on the voice channel by either a simplex or composite connection to the trunk line.

In designing an electronic telephone system it may be desirable, for economic reasons, to superimpose the supervisory channel on the voice channel in the switching stages in much the same fashion as is now done with trunk lines. To my knowledge, however, there has not been an electronic switch capable of simultaneously switching the voice and supervisory channels for bilateral transmission in each channel prior to this invention.

Accordingly, it is the general object of this invention to provide a new and improved electronic switch.

It is a more particular object of this invention to provide a new and improved electronic switch capable of switching two channels simultaneously for bilateral transmission in both channels.

The present invention accomplishes the above cited objects by providing an electronic switch comprising first and second semi-conductive devices, each having first and second emitter-collector junctions and a control, or base, electrode. The switch is interposed in the two wire, two channel line to be closed with the first and second junctions of the first device connected in series with one wire of the line and the first and second junctions of the second device connected in series with the other wire of the line. The switch is turned "off" and "on" by the application of suitable potentials to a common connection to the control electrodes of the two devices. When the switch is in the "on" condition and in the absence of signals in both channels, both junctions are biased in the forward directions as if they were emitter junctions. The instantaneous value of the sum of the signals appearing in both channels determines which of the junctions of each device functions as an emitter junction and which junction of each device functions as a collector junction.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing which shows a bilateral transistor switch interposed in a simplexed line.

Referring to the drawing, it will be noted that transistors 1 and 5 are of the PNP junction type. As is well known in the art, NPN junction transistors could be used in the same circuit if the polarity of the biasing potentials was reversed. The transistors have been given the notation of an arrow superimposed on both the so-called emitter and collector electrodes. This notation signifies that the transistors are bilateral in operation and have good amplification with either junction used as the emitter. Most transistors have this characteristic to a sufficient extent although better results can be achieved with transistors specially designed to have good forward and reverse characteristics.

Transistors 1 and 5 are interposed in a two wire line extending between first and second line terminals. A first signal channel, which may be a voice channel, and which comprises line 1 and line 2, is coupled to the two wire line at the line terminals by transformers 9 and 10, respectively. A second signal channel, which comprises supervisory circuit 1 and supervisory circuit 2, is coupled to the two wire line at the line terminals by means of a simplex circuit connection to the center tapped secondary windings of transformers 9 and 10. The second signal channel may be a supervisory channel carrying dial impulses, holding ground, or the like, or, for different applications of the circuit, it may be a second voice channel. The emitter-collector electrodes 2 and 3 of transistor 1 are connected in series with the upper wire of the line, and the emitter-collector electrodes 6 and 7 of transistor 5 are connected in series with the lower wire of the line. The conductivity of the transistors is controlled over a multiple connection to the base electrodes 4 and 8 through base resistors 11 and 12, respectively.

A simple mechanical switch S has been shown for the purpose of controlling the "off-on" condition of the transistor switch. It is to be understood that any well known means may be used to control the application of the control potentials to the base electrodes.

With switch S in the "off" condition, transistors 1 and 5 are rendered non-conductive since a PNP transistor is non-conductive whenever the base is positive with respect to the emitter. Switch S serves to connect positive potential source +E to the base electrodes 4 and 8 while the emitter-collector electrodes 2, 3, 6, and 7 are at ground potential by virtue of the center tap connection to the secondary windings of transformers 9 and 10.

In some applications of the switch it may happen that signals appear in either or both channels when the switch is in the "off" condition. If this is the case, it is desirable that the voltage value of positive potential source +E be greater than the combined instantaneous value of signals appearing in both channels since the transistors of the switch would conduct if their emitter-collector electrodes became positive with respect to their base.

With the transistors in the non-conducting condition, a large insertion loss is presented to signals in either direction in either channel since a T-type attenuator is formed between the back resistance of the first junction of each transistor, the base circuit resistor, the back resistance of the second junction of each transistor, and the load resistance (not shown).

When switch S is operated to the "on" position, negative potential source —E is connected to base electrodes 4 and 8, and transistors 1 and 5 are rendered conductive to close the line for the bilateral transmission of signals in both the signal channels. It might be mentioned at this time that negative potential source —E is of high enough potential to provide sufficient base current to insure that the transistors are rendered fully conductive, or saturated, throughout the combined voltage swing of the signals appearing in both channels. In the absence of signals, both junctions of each of the transistors are biased in the forward direction as if they were emitter junctions. In transistor 1, base current flows from ground through resistor 13, the upper secondary winding of transformer 9, the junction between electrodes 2 and 4, and through resistor 11 to —E and also from ground through resistor 14, the upper secondary winding of transformer 10, the junction between electrodes 3 and 4, and through resistor 11 to —E. In transistor 5, base current flows from ground through resistor 13, the lower secondary winding of transformer 9, the junction between electrodes 6 and 8, and through resistor 12 to —E and also from ground through resistor 14, the lower secondary winding of transformer 10, the junction between electrodes 7 and 8, and through resistor 12 to —E.

It is to be noted that the signal applied to supervisory circuit 1 and supervisory circuit 2 stands at ground potential when the transistor switch is "off." When the switch is in the "on" condition, the potential is altered somewhat even in the absence of signals because of the voltage drop across resistors 13 and 14 due to the base current flow. The receiving apparatus in supervisory circuits 1 and 2 is made insensitive to this small variation in potential by suitable biasing of the apparatus in the well known manner. The resistance of resistors 13 and 14 is made as small as possible so as to reduce the "on-off" voltage variation without unduly loading the signal transmitting sources in supervisory circuits 1 and 2.

To facilitate the understanding of the circuit operation it will first be assumed that signals appear only in the first channel. Signals appearing on either line 1 or line 2 are induced in the secondary windings of transformers 9 and 10, respectively, and transmitted through the transistor switch. During the half-cycle of an input signal from line 1 which causes electrode 2 of transistor 1 to become positive with respect to ground, the junction between electrodes 2 and 4 acts as an emitter and the junction between electrodes 3 and 4 conducts the signal current as if it were a saturated collector. Electrode 3 then follows the potential of electrodes 2 and 4. During the half-cycle of an input signal from line 1 which causes electrode 2 to become negative with respect to ground, the junction between electrodes 3 and 4 acts as an emitter. The signal acts to subtract from the controlling base current somewhat, and the junction between electrodes 2 and 4 conducts signal current as if it were a saturated collector junction. The negative signal on electrode 2 therefore appears at electrode 3. The operation of transistor 5 is, of course, the reverse of the operation of transistor 1. That is, when electrode 2 of transistor 1 is positive and the junction between electrodes 2 and 4 is acting as an emitter, electrode 6 of transistor 5 is negative and the junction between electrodes 6 and 8 is acting as a collector. In the same manner, the instantaneous value of input signals from line 2 determines which of the junctions of each transistor functions as an emitter and which junction of each transistor functions as a collector. Signals appearing on lines 1 and 2 are, of course, isolated from the supervisory circuits 1 and 2 since the latter circuits are connected between the balanced secondary windings of the transformers.

Non-interfering signals may be passed between supervisory circuit 1 and supervisory circuit 2 in a bilateral manner while signals are being passed between line 1 and line 2. The signals appearing in the second channel may be pulses of short or long duration, such as dial pulses, or a hold potential which is applied for the duration of the call, respectively, or the second channel may be another voice channel. In any event, the first channel is isolated from signals appearing in the second channel since the change of signal current, which splits between the secondary windings of transformers 9 and 10, induces equal and opposite voltages in the secondary transformer windings. The signals appearing in the second channel add to or subtract from the signals induced in the secondary windings of the transformers from the first channel so that the point at which the junctions of each transistor change from emitter function to collector function is determined by the instantaneous sum of the signal voltages appearing in both channels.

Since transistors exhibit appreciable current gain with the base taken as the input electrode, the base resistors 11 and 12 may be made very large in comparison to the impedance level of the switch. Thus, when the transistors are conductive, the shunting effect of the base resistors is small and the insertion loss of the switch is low as a result. In one tested embodiment of the invention in which transistors 1 and 5 were of the 2N44 type, resistors 11 and 12 had a value of 10,000 ohms each, and resistors 13 and 14 had a resistance value of 2200 ohms each.

While there has been shown what is at present considered to be the preferred embodiment of the invention, other modifications will readily occur to those skilled in the art. It will be apparent that the signal channels may be connected to the terminals of the line in any desired manner so long as the channels are isolated from each other. For example, lines 1 and 2 could be capacitor coupled to the two wire line while supervisory circuits 1 and 2 could be coupled to the line through balanced bridge resistors. It is not, therefore, desired that the invention be limited to the specific arrangement shown and described, and it is intended to cover in the appended claims all such modifications as fall within the true spirit and scope of the invention.

What is claimed is:

1. In combination, a two wire line extending between first and second terminals, means for connecting a first signal channel to said line at said first and second terminals, means for connecting a second signal channel to said line at said first and second terminals, means at said first and second terminals for isolating said first channel from signals appearing in said second channel and for isolating said second channel from signals appearing in said first channel, an electronic switch for opening and closing said line, said switch comprising first and second semi-conductive devices, said devices each having first and second electrodes and a control electrode, means for connecting said first and second electrodes of said first device in series with one wire of said line, means for connecting said first and second electrodes of said second device in series with the other wire of said line, a common connection to said control electrodes, and means associated with said common connection for selectively controlling said switch either to block the transmission of signals in both said first and second channels or to permit the transmission of signals in both said first and second channels.

2. In combination, a two wire line extending between first and second terminals, means for connecting a first two-way signal channel to said line at said first and second terminals, means for connecting a second two-way signal channel to said line at said first and second terminals, means at said first and second terminals for isolating said first channel from signals appearing in said second channel and for isolating said second channel from signals appearing in said first channel, an electronic switch for opening and closing said line, said switch comprising first and second semi-conductive devices, said devices each having first and second electrodes and a control electrode, means for connecting said first and second electrodes of said first device in series with one wire of said line, means for connecting said first and second electrodes of said second device in series with the other wire of said line, a common connection to said control electrodes, and means associated with said common connectiontion for selectively controlling said switch either to block the transmission of signals in both said first and second channels or to permit the bilateral transmission of signals in both said first and second channels.

3. In combination, a two wire line extending between first and second terminals, means for connecting a first signal channel to said line at said first and second terminals, means for connecting a second signal channel to said line at said first and second terminals, means at said first and second terminals for isolating said first channel from signals appearing in said second channel and for isolating said second channel from signals appearing in said first channel, an electronic switch for opening and closing said line, said switch comprising first and second semi-conductive devices, said devices each having first and second emitter-collector junctions and a control electrode, means for connecting said first and second junctions of said first device in series with one wire of said line, means for connecting said first and second junctions of said second device in series with the other wire of said line, a common connection to said control electrodes, and means associated with said common connection for selectively controlling said switch either to block the transmission of signals in both said first and second channels or to permit the transmission of signals in both said first and second channels with the instantaneous value of the signals transmitted by each device determining which of said first and second junctions of each device functions as an emitter junction and which of said first and second junctions of each device functions as a collector junction.

4. In combination, a two wire line extending between first and second terminals, means for connecting a first signal channel to said line at said first and second terminals, means for connecting a second signal channel in simplex relation with said line at said first and second terminals, an electronic switch for opening and closing said line, said switch comprising first and second semi-conductive devices, said devices each having first and second electrodes and a control electrode, means for connecting said first and second electrodes of said first device in series with one wire of said line, means for connecting said first and second electrodes of said second device in series with the other wire of said line, a common connection to said control electrodes, and means associated with said common connection for selectively controlling said switch either to block the transmission of signals in both said first and second channels or to permit the simultaneous transmission of signals in both said first and second channels.

5. In combination, a two wire line extending between first and second terminals, means for connecting a first two-way signal channel to said line at said first and second terminals, means for connecting a second two-way signal channel in simplex relation with said line at said first and second terminals, an electronic switch for opening and closing said line, said switch comprising first and second semi-conductive devices, said devices each having first and second electrodes and a control electrode, means for connecting said first and second electrodes of said first device in series with one wire of said line, means for connecting said first and second electrodes of said second device in series with the other wire of said line, a common connection to said control electrodes, and means associated with said common connection for selectively controlling said switch either to block the transmission of signals in both said first and second channels or to permit the bilateral transmission of signals in both said first and second channels.

6. In combination, a two wire line extending between first and second terminals, means for connecting a first signal channel to said line at said first and second terminals, means for connecting a second signal channel in simplex relation with said line at said first and second terminals, an electronic switch for opening and closing said line, said switch comprising first and second semi-conductive devices, said devices each having first and second emitter-collector junctions and a control electrode, means for connecting said first and second junctions of said first device in series with one wire of said line, means for connecting said first and second junctions of said second device in series with the other wire of said line, a common connection to said control electrodes, and means associated with said common connection for selectively controlling said switch either to block the transmission of signals in both said first and second channels or to permit the simultaneous transmission of signals in both said first and second channels with the instantaneous value of the signals transmitted by each device determining which of said first and second junctions of each device functions as an emitter junction and which of said first and second junctions of each device functions as a collector junction.

References Cited in the file of this patent

UNITED STATES PATENTS 2,680,160 Yaeger ---------------- June 1, 1954
2,691,073 Lowman --------------- Oct. 5, 1954
2,691,075 Schwartz -------------- Oct. 5, 1954
2,698,392 Herman --------------- Dec. 28, 1954